(12) United States Patent
Caffeau et al.

(10) Patent No.: US 9,987,887 B2
(45) Date of Patent: Jun. 5, 2018

(54) AIRCRAFT TIRE WITH CARCASS REINFORCEMENT INCLUDING FIRST AND SECOND FAMILIES OF CARCASS LAYERS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Charlotte Caffeau, Clermont-Ferrand (FR); Arnaud Boursin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 610 days.

(21) Appl. No.: 14/397,090

(22) PCT Filed: Apr. 15, 2013

(86) PCT No.: PCT/EP2013/057817
§ 371 (c)(1),
(2) Date: Oct. 24, 2014

(87) PCT Pub. No.: WO2013/160136
PCT Pub. Date: Oct. 31, 2013

(65) Prior Publication Data
US 2015/0107747 A1    Apr. 23, 2015

(30) Foreign Application Priority Data
Apr. 24, 2012    (FR) ..................................... 12 53724

(51) Int. Cl.
*B60C 15/00*    (2006.01)
*B60C 9/04*    (2006.01)
(Continued)

(52) U.S. Cl.
CPC ........ *B60C 15/0072* (2013.01); *B60C 9/0042* (2013.01); *B60C 15/0009* (2013.01);
(Continued)

(58) Field of Classification Search
CPC ............ B60C 15/0076; B60C 2200/02; B60C 15/0018; B60C 15/0027; B60C 15/0009;
(Continued)

(56) References Cited

U.S. PATENT DOCUMENTS 2,971,553 A    2/1961 Woodall
3,253,638 A * 5/1966 Kersker .................... 152/556 X
(Continued)

FOREIGN PATENT DOCUMENTS

FR    2 953 763    6/2011
JP    2003226119 A * 8/2003
(Continued)

*Primary Examiner* — Adrienne C Johnstone
(74) *Attorney, Agent, or Firm* — Cozen O'Connor

(57) ABSTRACT

Aircraft tire comprises carcass reinforcement (5) comprising a first family of carcass layers extending between two beads (3), having at least one carcass layer wrapped, within each bead, from the inside towards the outside of the tire, around a bead wire (6) to form turn-up (511) having free end ($E_1$) radially outside of radially outermost point (E) of the bead wire. The second family comprises at least two carcass layers, adjacent each to the next, extending, within each bead, from outside towards inside of the tire, as far as their respective ends ($E_2$) which are radially inside of axial straight line ($D_Y$) through centre (O) of bead wire (6) and axially inside of a radial straight line ($D_Z$) through centre (O) at axial distance ($d_2$) at least equal to 5 mm. The carcass layers of the second family are axially inside of at least one turn-up of a carcass layer of the first family.

12 Claims, 1 Drawing Sheet

(51) Int. Cl.
*B60C 15/06* (2006.01)
*B60C 9/00* (2006.01)

(52) U.S. Cl.
CPC ...... *B60C 15/0018* (2013.01); *B60C 15/0632* (2013.01); *B60C 2009/0092* (2013.01); *B60C 2009/0466* (2013.01); *B60C 2200/02* (2013.01)

(58) Field of Classification Search
CPC ........ B60C 15/0072; B60C 2009/0466; B60C 15/0632
USPC .......................... 152/550, 553, 556, 557, 542
See application file for complete search history.

(56) References Cited

U.S. PATENT DOCUMENTS

| | | | | |
|---|---|---|---|---|
| 3,929,180 | A * | 12/1975 | Kawase | 152/556 |
| 4,029,137 | A * | 6/1977 | Suydam | 152/550 X |
| 4,263,957 | A * | 4/1981 | Abe | 152/556 X |
| 4,790,364 | A * | 12/1988 | Lobb | |
| 4,947,914 | A * | 8/1990 | Noma | B60C 15/0072 |
| 7,905,265 | B2 * | 3/2011 | Roget | B60C 15/0072 152/451 |
| 9,056,529 | B2 | 6/2015 | Cogne et al. | |
| 2011/0017379 | A1 * | 1/2011 | Chambriard | B60C 15/0072 152/553 |

FOREIGN PATENT DOCUMENTS

| | | |
|---|---|---|
| WO | WO 02/085646 | 10/2002 |
| WO | WO 2011/073059 | 6/2011 |

* cited by examiner

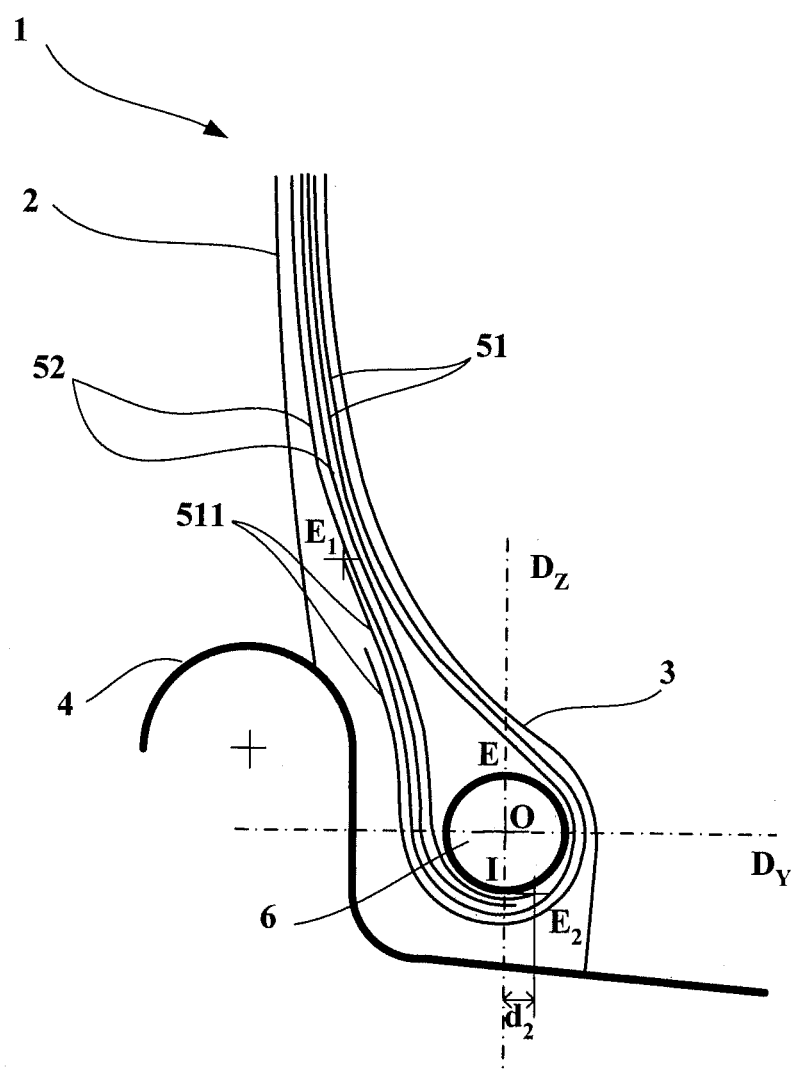

AIRCRAFT TIRE WITH CARCASS REINFORCEMENT INCLUDING FIRST AND SECOND FAMILIES OF CARCASS LAYERS

RELATED APPLICATIONS

This is a U.S. National stage of International application No. PCT/EP2013/057817 filed on Apr. 15, 2013. This patent application claims the priority of French application no. 1253724 filed Apr. 24, 2012.

FIELD OF THE INVENTION

The present invention relates to an aircraft tire, use of which is characterized by high pressure, load and speed conditions.

BACKGROUND OF THE INVENTION

An aeroplane tire needs more particularly to meet requirements of wear resistance and endurance. Endurance means the ability of the tire to resist over time the cyclic stresses to which it is subjected. When the tread of a tire is worn, which marks the end of a first useful life, the tire is retreaded, namely the worn tread is replaced with a new tread to allow a second service life. An improved resistance to wear means that a higher number of landings can be made per service life. Improved endurance means that the number of service lives that the same tire can have is increased.

In general, a tire comprises a tread intended to come into contact with the ground via a tread surface and connected by two side walls to two beads which are intended to provide a mechanical connection between the tire and the rim on which it is mounted.

In what follows, the circumferential, axial and radial directions respectively refer to a direction tangential to the tread surface of the tire in the direction of rotation of the tire, to a direction parallel to the axis of rotation of the tire and to a direction perpendicular to the axis of rotation of the tire. "Radially on the inside or respectively radially on the outside" means "closer to, respectively further away from, the axis of rotation of the tire". "Axially on the inside or respectively axially on the outside" means "closer to or respectively further away from the equatorial plane of the tire", the equatorial plane of the tire being the plane passing through the middle of the tread surface and perpendicular to the axis of rotation of the tire.

A radial tire more particularly comprises a reinforcement comprising a crown reinforcement, radially on the inside of the tread, and a carcass reinforcement, radially on the inside of the crown reinforcement.

The carcass reinforcement of an aeroplane tire generally comprises a plurality of carcass layers extending between the two beads and distributed between a first family and a second family.

The first family consists of carcass layers wrapped, within each bead, from the inside towards the outside of the tire, around a circumferential reinforcing element referred to as a bead wire to form a turn-up the end of which is generally radially on the outside of the radially outermost point of the bead wire. The turn-up is that portion of the carcass layer that lies between the radially innermost point of the carcass layer and the end thereof. The carcass layers of the first family are the carcass layers closest to the interior cavity of the tire and therefore the axially innermost ones in the side walls.

The second family consists of carcass layers extending, within each bead, from the outside towards the inside of the tire as far as an end which is generally radially on the inside of the radially outermost point of the bead wire. The carcass layers of the second family are the carcass layers closest to the exterior surface of the tire and therefore axially outermost in the side walls.

Usually, the carcass layers of the second family are positioned, along their entire length, on the outside of the carcass layers of the first family, i.e. they, in particular, envelop the turn-ups of the carcass layers of the first family.

Each carcass layer of the first and second family is made up of mutually parallel reinforcing elements making an angle comprised between 80° and 100° with the circumferential direction.

The reinforcing elements of the carcass layers are usually cords made up of spun textile filaments, preferably made of aliphatic polyamide or of aromatic polyamide and characterized by their mechanical extension properties.

The mechanical extension properties of the textile reinforcing elements, such as the modulus of elasticity, the elongation at break and the strength at break, are measured after initial conditioning. "Initial conditioning" means that the textile reinforcing elements are stored for at least 24 hours, prior to measurement, in a standard atmosphere in accordance with European Standard DIN EN 20139 (temperature of 20±2° C.; relative humidity of 65±2%). The measurements are then taken in the known way using a ZWICK GmbH & Co (Germany) tensile testing machine of type 1435 or type 1445. The textile reinforcing elements undergo tension over an initial length of 400 mm at a nominal rate of 200 mm/min. All the results are averaged over 10 measurements.

In use, an aeroplane tire is subjected to a combination of load and pressure which leads to a high degree of flexing, typically in excess of 30%. The degree of flexing of a tire is, by definition, its radial deformation, or its radial height variation when the tire changes from an unladen inflated state to a statically laden inflated state under pressure and load conditions as defined for example by the Tire and Rim Association or TRA standard. It is defined by the ratio of the radial height variation of the tire to half the difference between the outside diameter of the tire, measured statically in an unladen state inflated to the reference pressure, and the maximum diameter of the rim, measured on the rim flange. The TRA standard particularly describes the squashing of an aeroplane tire in terms of its squashed radius, i.e. the distance between the axis of the wheel of the tire and the plane of the ground with which the ground is in contact under the reference pressure and loading conditions.

An aircraft tire is also subjected to a high inflation pressure, typically in excess of 9 bar. This high pressure level entails a high number of carcass layers, because the carcass reinforcement is dimensioned to provide the tire with the ability to resist this level of pressure with a high factor of safety. By way of example, the carcass reinforcement of a tire with a service pressure, as recommended by the TRA standard, of 15 bar needs to be rated to withstand a pressure of 60 bar, assuming a factor of safety of 4. With the textile materials currently employed for the reinforcing elements, such as aliphatic polyamides or aromatic polyamides, the carcass reinforcement may, for example, comprise at least 5 carcass layers.

In use, the mechanical stresses of running induce flexing cycles in the beads of the tire which wrap over the rim flanges. These flexing or bending cycles generate in particular, within the carcass layer portions situated in the region of bending over the rim, variations in curvature which combine with the variations in elongation of the reinforcing elements of the carcass layers. These variations in elongation or deformations, particularly in the axially outermost carcass layers, may have negative minimum values corresponding to their being in compression. This compressive loading is likely to cause fatigue failure of the reinforcing elements and therefore premature tire degradation.

Those skilled in the art furthermore know that carcass layers comprising reinforcing elements made of aromatic polyamides have a low compression strength and are particularly sensitive to fatigue failure in compression.

In order to improve the fatigue strength of the beads of a tire intended to carry heavy loads and inflated to a high pressure, such as an aeroplane tire, document EP 0 567 521 describes a carcass reinforcement in which the ends of the axially outermost carcass layers are positioned between the respective turn-ups of the axially innermost carcass layers and are wrapped from the inside towards the outside of the tire around a bead wire.

The carcass reinforcement, as described in document EP 1 381 525, comprises at least two carcass layers of a first family, wrapped from the inside towards the outside of the tire around a bead wire, and at least one carcass layer axially on the outside of the carcass layers of the first family and their respective turn-ups. The solution proposed for improving the endurance of the beads of an aeroplane tire lies in the replacement of the carcass layers formed of reinforcing elements made of aliphatic polyamide with carcass layers formed of hybrid reinforcing elements, namely elements formed of spun filaments of different moduluses. The reinforcing elements of the carcass layers are cords formed by twisting and folding at least one spun yarn that has an elastic modulus in extension of at least 2000 cN/tex, with an overtwisted or not overtwisted spun yarn with a modulus of elasticity in extension of at most 1500 cN/tex, said moduluses of elasticity in extension of said spun yarns being measured for a tensile force equal to 0.1 times the breaking strength of a spun yarn.

SUMMARY OF THE INVENTION

One object of the invention is to still further improve the endurance of the carcass reinforcement of an aeroplane tire, in the region where the bead flexes over the rim.

This objective has been achieved, according to one aspect of the invention directed to an aeroplane tire comprising:

a tread connected by two side walls to two beads, which are intended to provide a mechanical connection between the tire and a rim, a crown reinforcement, radially on the inside of the tread, and a carcass reinforcement radially on the inside of the crown reinforcement, the carcass reinforcement comprising a first and a second family of carcass layers extending between the two beads, the first family comprising at least one carcass layer wrapped, within each bead, from the inside towards the outside of the tire, around a circumferential reinforcing element known as a bead wire to form a turn-up having a free end radially on the outside of the radially outermost point of the bead wire, the second family comprising at least two carcass layers, adjacent each to the next, extending, within each bead, from the outside towards the inside of the tire, as far as their respective ends which are radially on the inside of an axial straight line passing through the centre of the bead wire and axially on the inside of a radial straight line passing through the centre of the bead wire at an axial distance at least equal to 5 mm, the carcass layers of the second family being axially on the inside of at least one turn-up of a carcass layer of the first family.

The carcass layers of the second family, adjacent one to the next, imply that there is no carcass layer turn-up of the first family interposed between two adjacent layers of the second family. The carcass layers of the second family thus form a set of juxtaposed layers.

Furthermore, the ends of the carcass layers of the second family are radially on the inside of an axial straight line passing through the centre of the bead wire. What is meant by the centre of the bead wire is the centre of the circle circumscribed around the meridian section of the bead wire of polygonal or substantially circular overall shape. The axial straight line passing through the centre of the bead wire is the straight line parallel to the axis of rotation of the tire and passing through the centre of the bead wire. The ends of the carcass layers of the second family are then interposed between the bead wire and a radial portion of the rim flange, referred to as the rim flange hook, and are therefore subjected to the clamping pressure loadings applied by the bead wire to the rim flange hook, contributing to the anchorage of said ends in the bead.

In addition, the ends of the carcass layers of the second family are axially on the inside of a radial straight line passing through the centre of the bead wire. The radial straight line passing through the centre of the bead wire is the straight line parallel to the equatorial plane of the tire and passing through the centre of the bead wire. In this case, the carcass layers of the second family are engaged under the bead wire, without however forming a turn-up, because their respective ends remain radially on the inside of the axial straight line passing through the centre of the bead wire. The ends of the carcass layers of the second family are therefore interposed between the bead wire and a substantially axial portion of the rim flange, referred to as the rim flange seat and are therefore subjected to the clamping pressure forces applied by the bead wire to the seat of the rim flange, which is an area of high pressure, and this contributes to enhancing still further the anchorage of said ends in the bead.

Finally, the axial distance between the end of each carcass layer of the second family and radial straight line passing through the centre of the bead wire is at least equal to 5 mm. This minimum distance guarantees that the said end is axially well on the inside of the radial straight line passing through the centre of the bead wire, taking the manufacturing tolerances on the tire into consideration.

According to an embodiment of the invention, the carcass layers of the second family are axially on the inside of at least one turn-up of one carcass layer of the first family, which entails that the carcass layers of the second family, axially furthest out in the side walls, are positioned axially on the inside of at least one carcass turn-up of the first family, in the zone of flexing of the bead on the rim flange referred to as the rim flexing zone, rather than on the outside of all the turn-ups as they were in the conventional prior art.

As a result, the carcass layers of the second family are brought closer to the neutral axis of the bead, which behaves mechanically like a beam in bending over the rim flange. As a result, the level of compression in the reinforcing elements of the carcass layers of the second family is reduced. This drop in compression is particularly significant in the reinforcing elements of the carcass layer axially furthest towards the outside in the zone of bending on the rim, which is the most compressed because it is furthest from the neutral axis of the bead. This then reduces the risk of fatigue failure of the said carcass layer in compression and, therefore, of the other carcass layers of the second family which are axially further towards the inside of the latter.

In practice, the position of the carcass layer of the second family which is axially furthest out in the region of bending on the rim is adjusted, with respect to the neutral axis of the bead, so as to obtain the lowest possible compression, or even practically zero compression, in the reinforcing elements of the said carcass. In consequence, the reinforcing elements in the other carcass layers of the second family, closer to the neutral axis of the bead, are then more or less in tension.

According to a preferred embodiment of the invention, the carcass layers of the second family are axially on the inside of all the turn-ups of the carcass layers of the first family. This configuration allows the carcass layers of the second family to be brought as close as possible to the neutral axis of the bead and therefore achieve minimum compression for a given number of carcass layers.

For preference, the reinforcing elements of a carcass layer are made of textile materials. Textile materials are commonly used in aeroplane tires, particularly in order to minimize the mass of the carcass layers and therefore that of the tire, something which is an essential factor in air transport.

The reinforcing elements of a carcass layer are made of an aliphatic polyamide, such as nylon, a common material in the field of aeroplane tires.

More advantageously still, the reinforcing elements of a carcass layer are made of an aromatic polyamide, such as aramid. The use of aramid makes it possible to reduce the number of carcass layers by comparison with nylon, because the breaking strength of aramid is higher than that of nylon. Because the number of carcass layers is not as high as it is with nylon, the levels of compression in the carcass layers of the second family are not as high because the said carcass layers are less far away from the neutral axis of the bead.

For preference, the reinforcing elements of a carcass layer are hybrid reinforcing elements combining at least an aliphatic polyamide and at least an aromatic polyamide. Reinforcing elements of hybrid type are, for example, described in Patent EP 1 381 525. They offer a compromise between the advantages of nylon and those of aramid, by exhibiting bi-modulus behaviour characterized by a low elastic modulus at low elongations and a high elastic modulus at high elongations.

In order to improve the endurance of the bead still further, it is conceivable to improve the endurance of the carcass layers of the first and of the second family by using textile reinforcing elements which on account of their structure offer intrinsically better endurance.

One conventional method of manufacturing textile reinforcing elements involves a first step of overtwisting followed by a second step of folding. The overtwisting step consists in converting a spun yarn consisting of parallel textile filaments in overtwists by twisting the spun yarn in an anticlockwise direction, i.e. in the opposite direction to the direction in which the hands of a clock rotate. Next, several overtwists obtained in the preceding step are assembled to constitute a folded yarn by twisting the collection of overtwists in a clockwise direction, i.e. in the same direction as the hands of a clock move.

The level of twisting is expressed as a number of turns per meter. The level of twisting has an impact on the breaking strength, the extension modulus and the compression endurance of the reinforcing element. As the torsion increases, the breaking strength and the extension modulus decrease, whereas compressive endurance is improved.

The inventors have demonstrated that an over torsion, to obtain overtwists of the textile reinforcing elements of the carcass layers at least equal to 250 turns/meter and at most equal to 290 turns/meter allows the carcass layers to reach a satisfactory level of endurance.

According to a first alternative form of embodiment, the overtwists, for obtaining overtwists of the textile reinforcing elements of the carcass layers of the first and second families respectively are identical, which means that the type of textile reinforcing elements used can be standardized across the carcass layers of the first and of the second families.

According to a second alternative form of embodiment, it is advantageous for the overtwisting to obtain overtwists of the textile reinforcing elements of the carcass layers of the second family at least equal to 1.15 times the overtwisting to obtain the overtwists of the textile reinforcing elements of the carcass layers of the first family. By way of example, the overtwisting to obtain overtwists of the textile reinforcing elements of the carcass layers of the second family is equal to 290 turns/meter whereas the overtwisting to obtain the overtwists of the textile reinforcing elements of the carcass layers of the first family is equal to 250 turns/meter. In other words, the overtwisting is differentiated between the first and the second family of carcass layers, according to the mechanical stresses to which they are respectively subjected, particularly in compression.

Advantageously, the tire comprises an additional reinforcing layer referred to as a flipper strip wrapped around the bead wire and separating the bead wire from the carcass layers. This in particular implies that the carcass layer of the second family, which is axially furthest towards the inside, is not in direct contact with the bead wire.

BRIEF DESCRIPTION OF THE SINGLE DRAWING

FIG. 1 shows a meridian cross section through a tire bead according to an embodiment of the invention.

FIG. 1 has not been drawn to scale. Not all of the elements have necessarily been depicted. In particular, not all of the ends of the carcass layers have necessarily been referenced.

DETAILED DESCRIPTION OF THE SINGLE DRAWING

FIG. 1 shows a meridian cross section of a tire 1 according to the invention, mounted on a mounted rim 4, in the side wall 2 and bead 3 region.

The carcass reinforcement comprises a plurality of carcass layers distributed between a first family of carcass layers (51) and a second family of carcass layers (52).

The first family consists of two carcass layers (51) wrapped, within each bead (3), from the inside towards the outside of the tire, around a bead wire (6) to form a turn-up (511) of which the end ($E_1$) is radially on the outside of the radially outermost point (E) of the bead wire (6). The turn-up (511) is that portion of the carcass layer (51) that is comprised between the radially innermost point of the carcass layer, directly in line with the radially innermost point (I) of the bead wire (6), and the end ($E_1$) of the turn-up (511). The carcass layers (51) of the first family are the carcass layers closest to the interior cavity of the tire and therefore axially innermost within the side wall (2).

The second family consists of two carcass layers (52) extending, within each bead (3), from the outside towards the inside of the tire, as far as an end ($E_2$) radially on the inside of the radially outermost point (E) of the bead wire (6). The carcass layers (52) of the second family are the carcass layers closest to the exterior surface of the tire and therefore axially outermost, within the side wall (2).

The two carcass layers (52) of the second family are adjacent to one another and axially on the inside of all the turn-ups (511) of the carcass layers (51) of the first family. Moreover, the ends ($E_2$) of the carcass layers (52) of the second family are radially on the inside of the axial straight line ($D_Y$) passing through the centre (O) of the bead wire (6) and axially on the inside of the radial straight line ($D_Z$) passing through the centre (O) of the bead wire (6).

The invention has been studied more particularly for an aeroplane tire of radial carcass reinforcement and size 46×17.0R20, used on an airliner, and the nominal pressure of which is 15.9 bar, the nominal load of which is 20642 daN and the maximum speed of which is 378 km/h.

In the example studied, the carcass reinforcement comprises two carcass layers of the first family, two carcass layers of the second family and one additional reinforcing layer in contact with the bead wire. In the reference tire, representing the state of the art, the turn-ups of the layers of the first family are axially on the inside of the carcass layers of the second family. In the tire according to the invention, the turn-ups of the layers of the first family are axially on the outside of the carcass layers of the second family. The reinforcing elements of the carcass layers of the first and of the second family are identical and made of aliphatic polyamide or nylon.

In the above configurations, numerical simulations by finite element calculation demonstrated that the maximum compression in the carcass layer of the second family which is axially outermost is equal to 1.6%, for the reference tire, and drops to practically zero for a tire according to the invention, hence demonstrating the hoped-for gain in bead endurance.

The invention claimed is:

1. An aeroplane tire, comprising:
a tread connected by two side walls to two beads, which provide a mechanical connection between the tire and a rim;
a crown reinforcement, radially on the inside of the tread, and a carcass reinforcement radially on the inside of the crown reinforcement;
the carcass reinforcement comprising a first and a second family of carcass layers extending between the two beads;
the first family comprising at least one carcass layer wrapped, within each said bead, from the inside towards the outside of the tire, around a circumferential reinforcing element known as a bead wire to form a turn-up having a free end radially on the outside of the radially outermost point of the bead wire; and
the second family comprising at least two carcass layers, adjacent each to the next, extending, within each said bead, from the outside towards the inside of the tire, as far as their respective ends which are radially on the inside of an axial straight line passing through the centre of the bead wire and axially on the inside of a radial straight line passing through the centre of the bead wire at an axial distance at least equal to 5 mm,
wherein the carcass layers of the second family are axially on the inside of at least one turn-up of a carcass layer of the first family,
wherein each carcass layer comprises mutually parallel reinforcing elements,
wherein the reinforcing elements of each carcass layer are made of textile materials, and
wherein the textile reinforcing elements of each carcass layer being obtained by twisting, in the clockwise direction, at least two overtwists, each overtwist being obtained by twisting, in the anticlockwise direction, a spun fibre consisting of mutually parallel textile filaments, this twisting being defined by a number of turns per meter referred to as overtwisting,
wherein the overtwisting, to obtain the overtwists of the textile reinforcing elements of the carcass layers, is at least equal to 250 turns/meter and at most 290 turns/meter.

2. The aeroplane tire according to claim 1, wherein the carcass layers of the second family are axially on the inside of all the turn-ups of the carcass layers of the first family.

3. The aeroplane tire according to claim 1, wherein the overtwists of the textile reinforcing elements of each carcass layer are made of aliphatic polyamide filaments.

4. The aeroplane tire according to claim 1, wherein the overtwists of the textile reinforcing elements of each carcass layer are made of aromatic polyamide filaments.

5. The aeroplane tire according to claim 1, wherein the overtwists of the textile reinforcing elements of each carcass layer consist of at least one overtwist made of aliphatic polyamide filaments and at least one overtwist made of aromatic polyamide filaments.

6. The aeroplane tire according to claim 1, which comprises an additional reinforcing layer wrapped around the bead wire and separating the bead wire from the carcass layers.

7. An aeroplane tire, comprising:
a tread connected by two side walls to two beads, which provide a mechanical connection between the tire and a rim;
a crown reinforcement, radially on the inside of the tread, and a carcass reinforcement radially on the inside of the crown reinforcement;
the carcass reinforcement comprising a first and a second family of carcass layers extending between the two beads;
the first family comprising at least one carcass layer wrapped, within each said bead, from the inside towards the outside of the tire, around a circumferential reinforcing element known as a bead wire to form a turn-up having a free end radially on the outside of the radially outermost point of the bead wire; and
the second family comprising at least two carcass layers, adjacent each to the next, extending, within each said bead, from the outside towards the inside of the tire, as far as their respective ends which are radially on the inside of an axial straight line passing through the centre of the bead wire and axially on the inside of a radial straight line passing through the centre of the bead wire at an axial distance at least equal to 5 mm,
wherein the carcass layers of the second family are axially on the inside of at least one turn-up of a carcass layer of the first family,
wherein each carcass layer comprises mutually parallel reinforcing elements,
wherein the reinforcing elements of each carcass layer are made of textile materials, and
wherein the textile reinforcing elements of each carcass layer being obtained by twisting, in the clockwise direction, at least two overtwists, each overtwist being obtained by twisting, in the anticlockwise direction, a spun fibre consisting of mutually parallel textile filaments, this twisting being defined by a number of turns per meter referred to as overtwisting, wherein the overtwisting, to obtain the overtwists of the textile reinforcing elements of the carcass layers, of the second family is at least equal to 1.15 times the overtwisting, to obtain the overtwists of the textile reinforcing elements of the carcass layers of the first family.

8. The aeroplane tire according to claim 7, wherein the carcass layers of the second family are axially on the inside of all the turn-ups of the carcass layers of the first family.

9. The aeroplane tire according to claim 7, wherein the overtwists of the textile reinforcing elements of each carcass layer are made of aliphatic polyamide filaments.

10. The aeroplane tire according to claim 7, wherein the overtwists of the textile reinforcing elements of each carcass layer are made of aromatic polyamide filaments.

11. The aeroplane tire according to claim 7, wherein the overtwists of the textile reinforcing elements of each carcass layer consist of at least one overtwist made of aliphatic polyamide filaments and at least one overtwist made of aromatic polyamide filaments.

12. The aeroplane tire according to claim 7, which comprises an additional reinforcing layer wrapped around the bead wire and separating the bead wire from the carcass layers.

* * * * *